United States Patent
Fujimaki

(10) Patent No.: US 10,152,883 B2
(45) Date of Patent: Dec. 11, 2018

(54) DRIVING SUPPORT DEVICE

(71) Applicant: TOYOTA JIDOSHA KABUSHIKI KAISHA, Toyota-shi, Aichi-ken (JP)

(72) Inventor: Yusuke Fujimaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 15/232,108

(22) Filed: Aug. 9, 2016

(65) Prior Publication Data

US 2017/0092125 A1    Mar. 30, 2017

(30) Foreign Application Priority Data

Sep. 25, 2015   (JP) ................. 2015-188220

(51) Int. Cl.
*G08G 1/0962*  (2006.01)
*G06K 9/00*  (2006.01)

(52) U.S. Cl.
CPC ..... *G08G 1/09623* (2013.01); *G08G 1/09626* (2013.01); *G06K 9/00818* (2013.01)

(58) Field of Classification Search
CPC ...... B60W 50/00; B60W 50/08; B60W 50/14; G08G 1/096716; G08G 1/096827; G08G 1/096861; G08G 1/09623; G08G 1/09626; G01C 21/26; G06K 9/00818
See application file for complete search history.

(56) References Cited

U.S. PATENT DOCUMENTS

| | | | | |
|---|---|---|---|---|
| 5,638,116 A | * | 6/1997 | Shimoura | G05D 1/0246 348/118 |
| 6,801,638 B1 | * | 10/2004 | Janssen | B60K 35/00 340/910 |
| 2009/0041304 A1 | * | 2/2009 | Bradai | G08G 1/09623 382/104 |
| 2013/0110371 A1 | * | 5/2013 | Ogawa | G08G 1/095 701/70 |
| 2016/0350606 A1 | * | 12/2016 | Yoshitomi | G06K 9/00818 |
| 2017/0351411 A1 | * | 12/2017 | Buecker | G06F 3/04845 |

FOREIGN PATENT DOCUMENTS

| | | | | |
|---|---|---|---|---|
| JP | 2000206980 A | | 7/2000 | |
| JP | 2002-163643 A | | 6/2002 | |
| JP | 2008032503 A | | 2/2008 | |
| JP | 2009-037613 A | | 2/2009 | |
| JP | 2012-248111 A | | 12/2012 | |
| JP | 2012248111 A | * | 12/2012 | ............ G01G 21/26 |
| JP | 2013196359 A | | 9/2013 | |

* cited by examiner

*Primary Examiner* — Dramos Kalapodas
(74) *Attorney, Agent, or Firm* — Oliff PLC

(57) ABSTRACT

A driving support device detects a speed limit by imaging a speed sign indicating the speed limit of a traveling lane. Also, the driving support device continuously acquires attribute information from a car navigation system. The speed limit recognized from a road sign is displayed on a screen mounted in a vehicle. When the speed limit recognized from the road sign is not equal to a speed limit acquired from the car navigation system, a display time of the speed limit is limited. When the attribute information is changed, display of the speed limit is stopped.

3 Claims, 3 Drawing Sheets

DRIVING SUPPORT DEVICE

BACKGROUND OF THE INVENTION

1. Field of the Invention

The present invention relates to a technique in which a driver is notified of a speed limit by acquiring the speed limit from a road sign, etc.

2. Description of the Related Art

A road sign indicating a speed limit (hereinafter, simply referred to as a "speed sign") is installed on a road. A driver visually recognizes the speed sign to adjust a vehicle speed. However, it is not necessarily the case that a driver can visually recognize all of the speed signs surely, because of various reasons in which the driver is talking with a fellow passenger, gazing at a car navigation system, and the like.

In Patent Document 1, a speed sign is imaged by a camera such that a speed limit is acquired from the image information. When the speed limit acquired from the camera is displayed, a driver can visually recognize the speed limit even if he or she overlooks the speed sign, and hence safer driving can be achieved.

RELATED ART DOCUMENT

Patent Document

[Patent Document 1] Japanese Patent Application Publication No. 2002-163643

However, speed signs are not necessarily installed in proper places. As one example, the case is assumed where a vehicle enters an expressway B where the speed limit is 100 km/h from a general road A where the speed limit is 60 km/h. There is no problem when a speed sign indicating 100 km/h is installed at the boundary between the general road A and the expressway B. However, if there is no speed sign at the boundary, a speed limit of 60 km/h is still being displayed after the vehicle enters the expressway B.

SUMMARY OF THE INVENTION

The present invention has been made in view of these situations, and a main purpose thereof is to provide a technique in which, in a vehicle capable of acquiring a speed limit from a speed sign and displaying it, an improper speed limit is prevented from being notified.

In order to solve the aforementioned problem, a driving support device according to an embodiment of the present invention includes: a speed recognition unit that detects a speed limit by imaging a road sign indicating the speed limit of a traveling lane; an attribute acquisition unit that acquires attribute information from a car navigation system; and a speed display unit that displays the speed limit recognized from the road sign on a screen mounted in a vehicle. The speed display unit stops the display of the speed limit, when the attribute information is changed.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
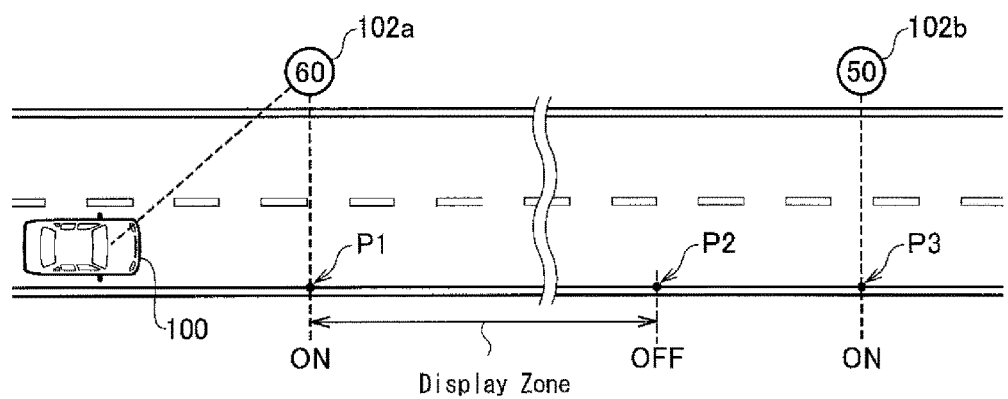
FIG. 1 is a first schematic view for explaining speed display control.

FIG. 1 is a first schematic view for explaining speed display control. A vehicle 100 has a camera mounted therein. The camera images a speed sign 102. A driving support device (described later) that is mounted in the vehicle 100 acquires information indicating a speed limit from the speed sign 102 by image recognition. Hereinafter, the speed limit acquired from the speed sign 102 is referred to as "main speed information." In the case of FIG. 1, it is recognized by the image recognition of a speed sign 102a that a speed limit at and after a point P1 is 60 km/h. When the vehicle 100 passes through the point P1, "Speed limit is 60 km/h" is displayed on a meter panel in the vehicle 100. Hereinafter, displaying the main speed information on a display device, such as a meter panel, is referred to as "speed display."

The driving support device continuously acquires information indicating the speed limit of a traveling lane also from a car navigation system. Hereinafter, the speed limit acquired from the car navigation system is referred to as "sub speed information." When acquiring the main speed information, the driving support device compares the main speed information with the sub speed information. As long as both are equal to each other, the driving support device continues to display the main speed information. On the other hand, when both are not equal to each other, the driving support device sets a display zone. When only the sub speed information is acquired, the speed display is not performed. The speed display is performed absolutely based on the main speed information.

FIG. 1 illustrates a situation where the main speed information acquired from the speed sign 102a is not equal to the sub speed information. In this case, the driving support device sets a "display zone" from the point P1 to a point P2. The speed display is maintained until the vehicle 100 passes through the point P2 (i.e., until the vehicle 100 leaves the display zone). Although the main speed information is acquired, it is not supported by the sub speed information, and hence a display time is limited.

The length of the display zone may be a constant value, or be selected from a plurality of preset values. For example, a plurality of distances may be matched beforehand to respective speed limits, so that the length of the display zone may be determined in accordance with the main speed information. For example, as the speed limit is larger, the distance of the display zone may be set to be larger. Alternatively, the length of the display zone may be limited by time, not distance. For example, a plurality of times may be matched beforehand to respective speed limits, so that a display time may be determined in accordance with the main speed information.

When the vehicle 100 passes through the point P2, the speed display disappears. When main speed information is acquired from the new speed sign 102b, new speed display is started from a point P3, which is a starting point, where the speed sign 102b is installed. Also, when a new speed sign 102 is installed between the points P1 and P2, speed display matched to the new speed sign 102 is performed.

Other than the above, when the vehicle 100 turns right or left, the speed display may be caused to disappear. The driving support device may detect a right or left turn of the vehicle 100 from a blinker or a steering angle of a steering wheel.

Figure 2:
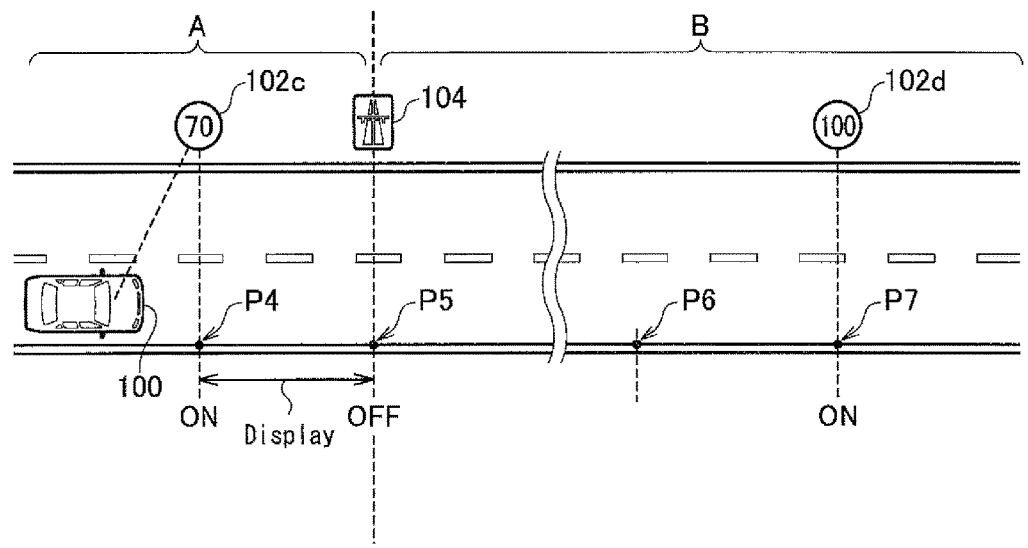
FIG. 2 is a second schematic view for explaining speed display control.

FIG. 2 is a second schematic view for explaining the speed display control. The driving support device of the present embodiment further determines a stop timing of the speed display by using attribute information (described later) acquired from the car navigation system. In FIG. 2, a general road A and an expressway B are connected together. The vehicle 100 is in the general road A and travels toward the expressway B. There is no problem when a speed sign 102*d* for the expressway B is installed at a point P5, which is the boundary between the general road A and the expressway B; however, in FIG. 2, the speed sign 102*d* for the expressway B is installed at a point P7 far ahead of the point P5.

It is assumed that the speed limit indicated by a speed sign 102*c* for the general road A is 70 km/h and the speed limit indicated by the speed sign 102*d* for the expressway B is 100 km/h. It is assumed that, in FIG. 2, the main speed information that the vehicle 100 has acquired from the speed sign 102*c* is not equal to the sub speed information acquired from the car navigation system. In this case, the driving support device sets a display zone between points P4 and P6. It is assumed that the point P6 is located ahead of the point P5 (boundary). Accordingly, in the case of the speed display control described with reference to FIG. 1, wrong speed display reading "Speed limit is 70 km/h" is continued to be displayed for a while after the vehicle 100 enters the expressway B.

So, the driving support device of the present embodiment determines a stop timing of the speed display based not only on the sub speed information acquired from the car navigation system but also on attribute information. The car navigation system has information indicating a road type for every road. When on the general road A, the vehicle 100 receives a road type ID=X1 indicating a general road from the car navigation system, and when on the expressway B, it receives a road type ID=X2 indicating an expressway. The driving support device regularly and continuously acquires a road type ID from the car navigation system. Because the road type ID is changed from X1 to X2 at the point P5, the driving support device can recognize at the point P5 that the road has been changed from a general road to an expressway. When such a change is recognized, the driving support device stops the speed display even if the vehicle 100 is traveling in a display zone (section between P4 and P6). With such a processing method, the speed limit for the general road A is prevented from being speed displayed continuously after the vehicle 100 passes through the point P5. When speed display is stopped, a display content is deleted from a monitor (i.e., display memory corresponding to a monitor).

When the speed information on the expressway B is newly recognized from the speed sign 102*d*, new speed display is performed at and after the point P7 where the speed sign 102*d* is installed.

Herein, an expressway sign 104, which is a road sign indicating an expressway, is normally installed at the point P5. It is good that the driving support device can image-recognize also the expressway sign 104, but there are many types of the expressway sign 104, and hence the present embodiment assumes the case where image recognition of the expressway sign 104 is not performed. Because a driver can recognize that the vehicle 100 travels on the expressway B from on the general road A by visually recognizing such an expressway sign 104, there is the possibility that a driver may feel a sense of discomfort if the speed limit for the general road A is displayed on the front panel after the vehicle passes through the point P5. The stop timing of the speed display can be set to a realistic one by detecting a change in the road type ID at the point P5 (boundary).

In the present embodiment, the stop timing of the speed display is determined by not only the road type but also a regional type. The car navigation system also has information indicating regional types, such as prefectures, cities, wards, towns, and villages, and countries. The speed limits for general roads may be changed depending on countries. A situation is assumed in which, for example, a vehicle enters France from Spain. When in Spain, the vehicle 100 receives a regional type ID=Y1 indicating Spain from the car navigation system, and when in France, it receives a regional type ID=Y2. Because the regional type ID is changed from Y1 to Y2 at the border, the driving support device can recognize that the vehicle 100 has passed through the border. When such a change is recognized, the driving support device stops the speed display at the timing when the vehicle passes through a border. With such a processing method, the speed display of a speed limit in Spain can be prevented from being displayed continuously after the vehicle 100 enters France by passing through the border. In the embodiment, the regional type ID and the road type ID are collectively referred to as "attribute information."

In summary of the above, speed display is performed on the meter panel when main speed information is acquired from the speed sign 102. When the main speed information is not equal to sub speed information, a display zone is set as a section where the speed display of the main speed information is continuously performed. The speed display is continued until any one of the following conditions is satisfied:

1. the vehicle 100 passes through a display zone;
2. the vehicle 100 turns right or left; and
3. attribute information, such as a road type or a regional type, is changed. With such a processing method, the risk that wrong speed display, which does not match the reality, may be continuously performed can be avoided, while the speed display based on the speed sign 102 is being performed.

Figure 3:
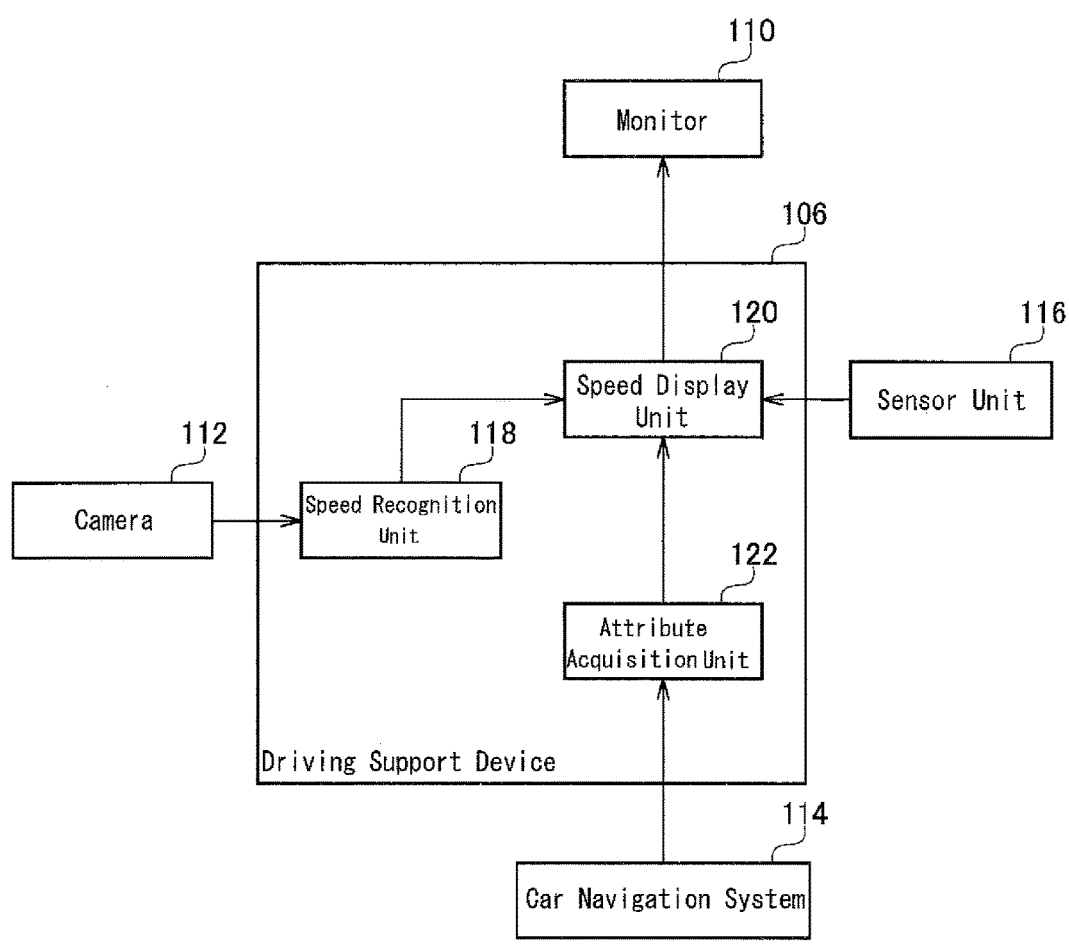
FIG. 3 is a functional block view of a driving support system.

FIG. 3 is a functional block view of a driving support system 108. Each component of the driving support system 108 can be achieved by an arbitrary combination of hardware and software, focusing on a CPU, a memory, programs loaded in the memory by which the components of this view can be achieved, a storage unit that stores the programs, such as a hard disk, an interface for network connection, and the like of an arbitrary computer. It can be understood by those skilled in the art that there are various variations for a method and a device achieving it. Each view described below illustrates blocks in functional units, not configurations in hardware units.

The driving support system 108 includes a driving support device 106, a camera 112, a car navigation system 114, a monitor 110, and a sensor unit 116. The sensor unit 116 collects information on an external environment and the traveling track of an own vehicle. The sensor unit 116 may also include a steering angle sensor, a yaw rate sensor, a wheel pulse sensor, a radar, and a blinker, etc. The sensor unit 116 may determine right or left turn of the vehicle 100 by detecting an operation of the blinker or detecting turning-back of the steering wheel with the steering angle sensor.

The driving support device 106 performs speed display by acquiring the main speed information from the speed sign 102 and determines a timing when the speed display is stopped. Each functional block of the driving support device 106 in the present embodiment is constituted by an ECU (Electronic Control Unit) and a software program executed thereon.

The driving support device 106 includes a speed recognition unit 118, a speed display unit 120, and an attribute acquisition unit 122. The speed recognition unit 118 detects the speed sign 102 from a still image or moving image acquired from the camera 112, so that the main speed information, which is the speed limit indicated in the speed sign 102, is read by the image recognition. A technique for image-recognizing the main speed information from the speed sign 102 can be achieved by applying a known technique. The speed recognition unit 118 transmits the main speed information to the speed display unit 120, and the speed display unit 120 displays the main speed information on the monitor 110. The monitor 110 is installed in the meter panel in the driver's seat.

The car navigation system 114 specifies a traveling lane by comparing map information in a data base with position information acquired from a GPS (Global Positioning System). In the data base in the car navigation system 114, speed limit (sub speed information) and the road type ID are matched to a traveling lane (road). In the data base in the car navigation system 114, position information (latitude and longitude information) and the regional type ID are also matched to each other. The car navigation system 114 regularly acquires position information from a GPS satellite in order to continuously transmit the speed limit (sub speed information) and the attribute information (road type ID and regional type ID) in accordance with the position information to the attribute acquisition unit 122. The attribute acquisition unit 122 transmits the attribute information and the sub speed information to the speed display unit 120.

When acquiring the main speed information from the speed recognition unit 118, the speed display unit 120 performs the speed display of it and compares the main speed information with the sub speed information. When both are not equal to each other, a display zone is set. When the vehicle 100 passes through the display zone, when the vehicle 100 turns right or left, or when the attribute information is changed, the speed display is stopped.

Figure 4:
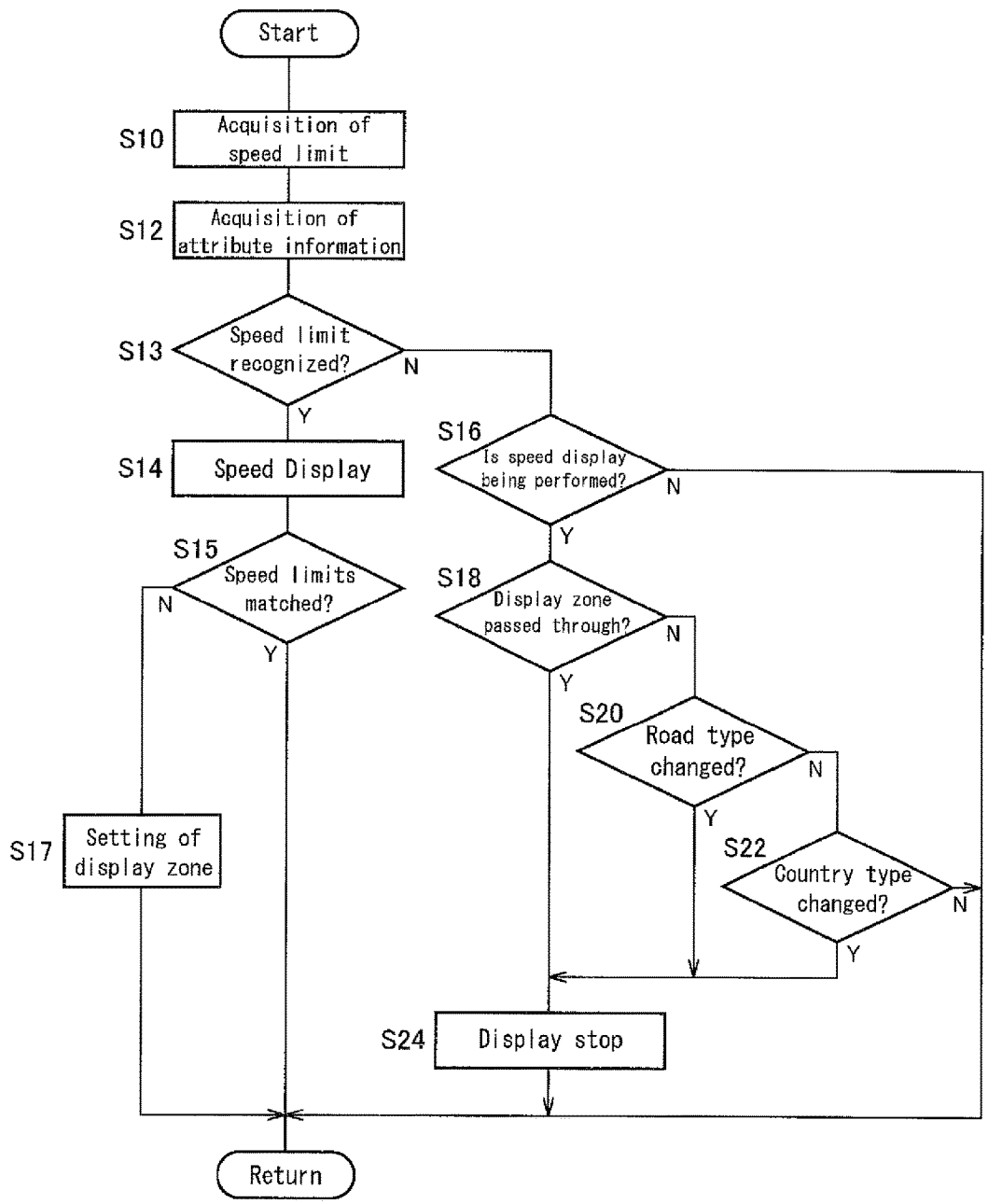
FIG. 4 is a flowchart of speed display processing.

FIG. 4 is a flowchart of the speed display processing. The processing illustrated in FIG. 4 is loop processing executed repeatedly at constant intervals, for example, every several milliseconds.

The attribute acquisition unit 122 acquires a speed limit (sub speed information) and attribute information from the car navigation system 114 (S10, S12). When the speed recognition unit 118 can detect main speed information from the images taken by the camera 112 (S13/Y), the speed recognition unit 118 sends the main speed information to the speed display unit 120, so that the speed display unit 120 displays the main speed information on the monitor 110 (S14). When the main speed information is not equal to the sub speed information (S15/N), the speed display unit 120 sets a display zone (S17). When the main speed information is equal to the sub speed information (S15/Y), a display zone is not set. In other words, a display limit is not made.

When the main speed information is not detected (S13/N), the processing shifts to S16. When speed display is not being performed (S16/N), subsequent processing are not executed. When speed display is being performed (S16/Y) and when the timing of the vehicle 100 leaving the display zone is reached (S18/Y), the speed display unit 120 stops the speed display (S24). After setting a display zone in S17, the speed display unit 120 calculates a travel distance of the vehicle 100, and when the travel distance is more than the length of the display zone, the speed display unit 120 determines that the vehicle 100 has left the display zone.

Even before the vehicle 100 leaves a display zone or even when limitation by a display zone is not set (S18/N), the speed display unit 120 stops the speed display (S24) as long as a road type is changed (S20/Y). Specifically, the attribute acquisition unit 122 regularly receives the road type ID from the car navigation system 114, and forwards the road type ID to the speed display unit 120. The speed display unit 120 compares the road type ID received last time with the newest road type ID, and when both are not equal to each other, it determines that a road type has been changed.

Even when a road type has not been changed (S20/N), the speed display unit 120 stops speed display (S24) when a regional type has been changed (S22/Y). Specifically, the attribute acquisition unit 122 regularly receives the regional type ID from the car navigation system 114, and forwards the regional type ID to the speed display unit 120. The speed display unit 120 compares the regional type ID received last time with the newest regional type ID, and when both are not equal to each other, it determines that a regional type has been changed. When also a regional type has not been changed (S22/N), the speed display is maintained as it is.

Although not illustrated because a flowchart becomes complicated, speed display is stopped also when right or left turn of the vehicle 100 is detected. An algorithm is only required to be employed in S18, in which display is stopped when a vehicle passes through a display zone or when right or left turn of a vehicle is detected.

The driving support system 108 has been described above based on preferred embodiments. In the present embodiment, when a road or a region (in particular, country) is changed, in other words, when a change in an environment that is a premise for a speed limit is detected, speed display is stopped. Accordingly, it can be avoided that a driver may feel a sense of discomfort caused with the speed display, occurring before the change in an environment, being displayed continuously after the change. The road types are exemplified by a general road and an expressway, but it should not be limited thereto. Various road types, such as, for example, a bridge, a parking lot, a private road, and an unclear road (road where a road type cannot be acquired), may be set. Additionally, an urban area and a suburban area, etc., other than countries and cities, wards, towns, and villages, may be set as the regional type.

The present invention has been described above based on embodiments. These embodiments are described for exemplary purposes only, and it can be readily understood by those skilled in the art that various modifications can be made by any combination of the components or processes of the embodiments and such modifications are also encompassed in the scope of the present invention.

What is claimed is:

1. A driving support device comprising:
   a speed recognition unit that detects a speed limit by imaging a road sign indicating the speed limit of a traveling lane;
   an attribute acquisition unit that acquires a speed limit of a traveling lane and attribute information from a car navigation system; and
   a speed display unit that displays the speed limit recognized from the road sign on a screen mounted in a vehicle, wherein
the speed display unit stops display of the speed limit when the attribute information is changed,
when a speed limit recognized from the road sign is not equal to a speed limit acquired from the car navigation system, the speed display unit limits a display time of the speed limit, according to a predetermined display zone being set up by the unequal speed limit condition determined between the speed limit acquired from the car navigation system and the speed limit recognized from the road sign, and
when a speed limit recognized from the road sign is equal to a speed limit acquired from the car navigation system, the speed display unit does not limit a display time of the speed limit.

2. The driving support device according to claim 1, wherein
the attribute acquisition unit acquires the attribute information as information by which an expressway and a general road are distinguished from each other.

3. The driving support device according to claim 1, wherein
the attribute acquisition unit acquires the attribute information as information by which a traveling area is distinguished, a change in a driving direction, a road sign identification, or a regional type identification being distinguished.

* * * * *